May 21, 1929.　　　F. J. ENGLEN ET AL　　　1,714,355
BACON SKINNING MACHINE
Filed Aug. 23, 1927　　　4 Sheets-Sheet 1

May 21, 1929.   F. J. ENGLEN ET AL   1,714,355
BACON SKINNING MACHINE
Filed Aug. 23, 1927   4 Sheets-Sheet 3

Inventor
Frederick J. Englen
Julius F. Geiler
By
Attorney

Inventor
Frederick J. Englen
Julius F. Geiter

Attorney

Patented May 21, 1929.

1,714,355

UNITED STATES PATENT OFFICE.

FREDERICK J. ENGLEN AND JULIUS F. GEILER, OF SOUTH SIDE OMAHA, NEBRASKA.

BACON-SKINNING MACHINE.

Application filed August 23, 1927. Serial No. 214,914.

This invention relates to improvements in bacon skinning machines, one object of the invention being the provision of a machine of this character in which the bacon skin is removed in transit with the least possible waste of the fat and in a uniform manner.

Another object of this invention is the provision of a novel construction of rind- or skin-engaging means carried by a movable member so that during the cutting operation the rind is removed and held in proper relation to the slab of meat and until the same is entirely removed from said slab, there being novel means for actuating the gripping devices whereby the rind or skin is primarily gripped at the initial cutting operation and automatically released after the final cut of the same.

Still another object of this invention is the provision of a machine of this character in which a novel means for raising and lowering a cooperating feed roller is provided at the final severance of the rind or skin from the meat and previous to the insertion of a new slab.

Still another object of this invention is the provision of a machine of this character which is as near automatic as possible, which is thoroughly efficient and practical in use, and which will accomplish the purpose for which it is designed in a thorough manner and with the least possible waste.

In the accompanying drawings:—

Figure 1:
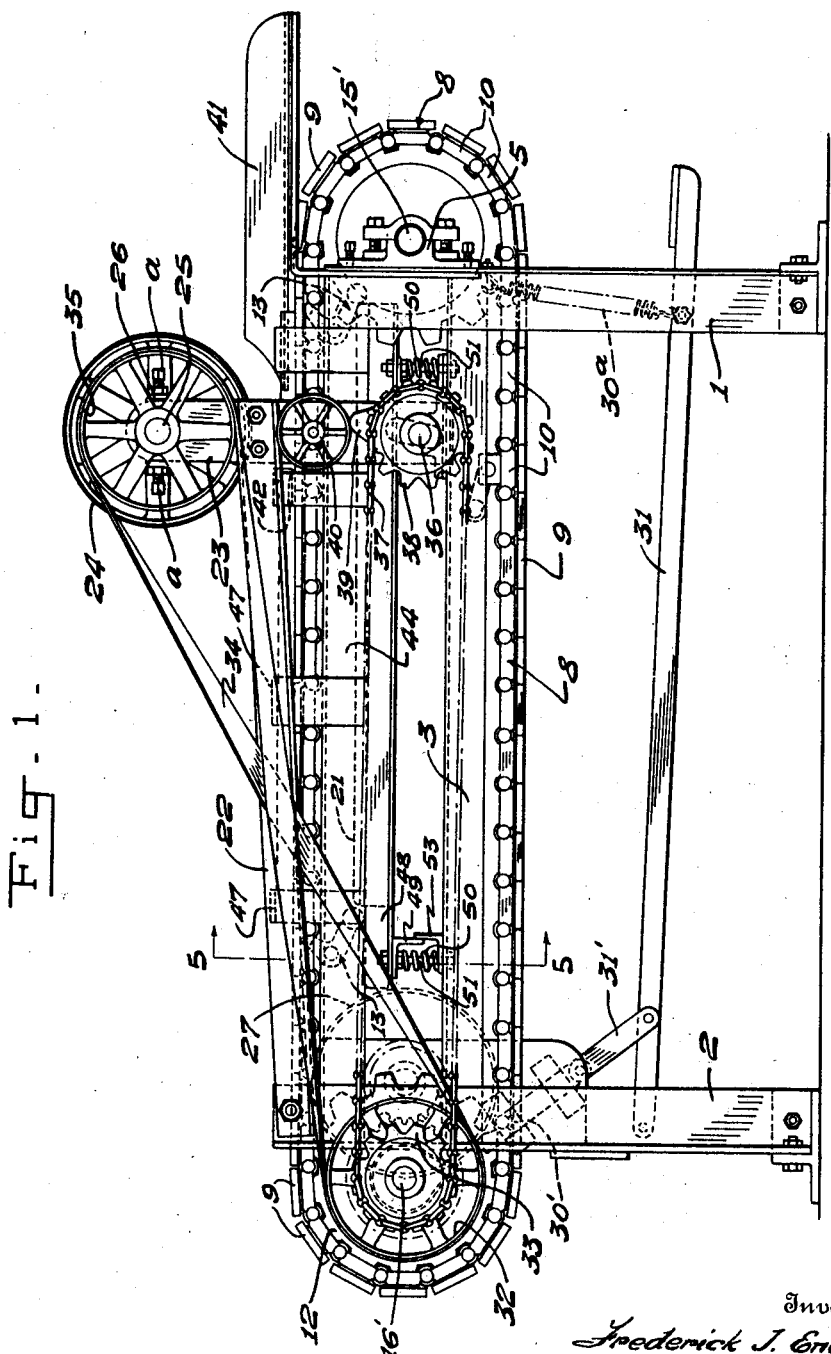
Figure 1 is a view taken from the left side of the complete machine.

Referring to the drawings: The numerals 1 and 2 designate, respectively, the front pair and the rear pair of legs which are connected together by the side frame angle-irons 3 and 44.

Carried by the respective pairs of legs 1 and 2 are the journaled bearings 5, which, as will presently appear, provide the supports for the shafts 15′ and 16′, respectively.

Figure 3:
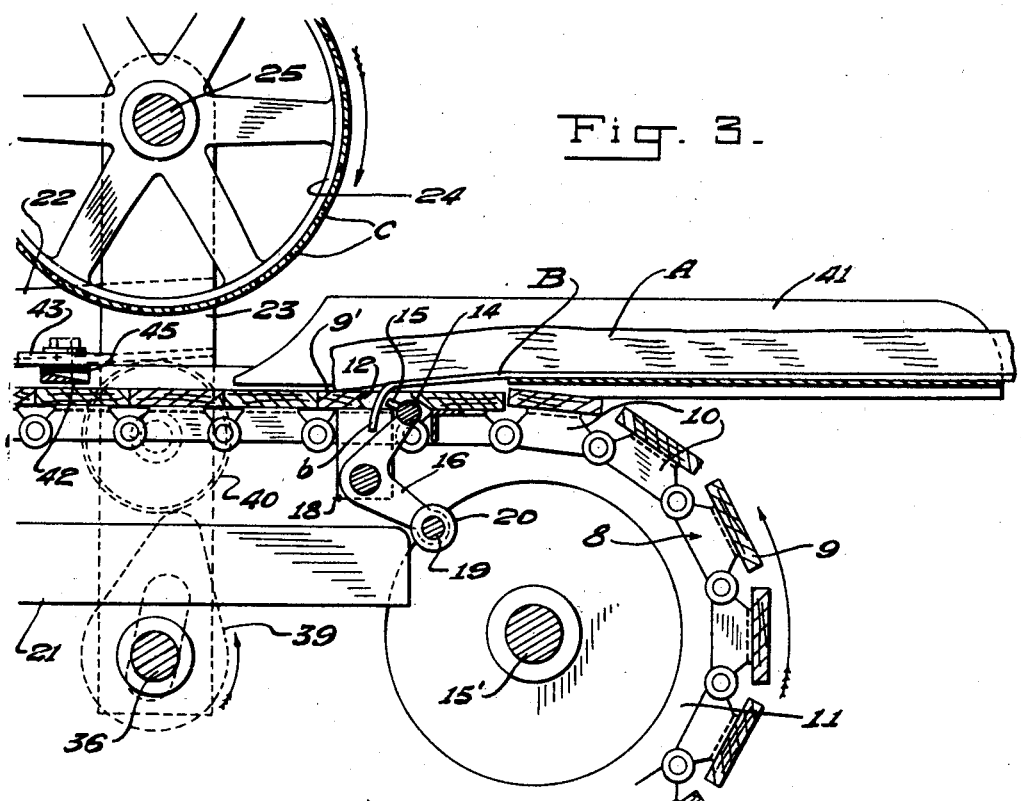
Figure 3 is an enlarged detail sectional view through the feed-in end showing the position of the parts just previous to the gripping of the skin or rind.
Figure 4:
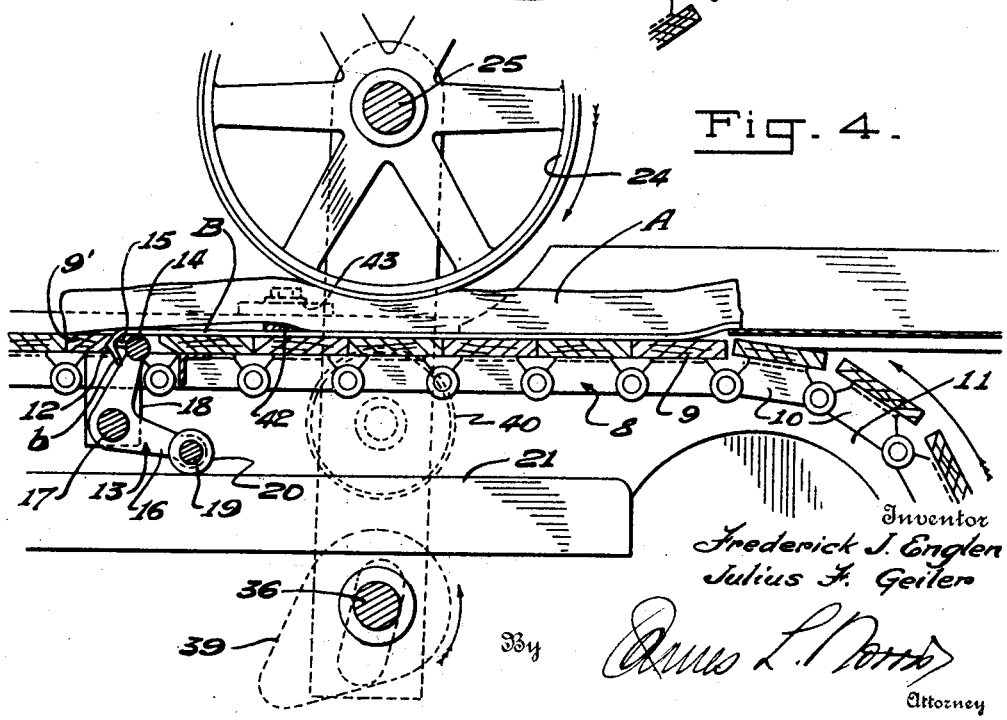
Figure 4 is a similar view to Figure 3, showing the position of the slab of meat and the rind during the severing or cutting operation.

The endless conveyor or table 8 consists of a plurality of link sections 10 carrying the respective transverse slats 9 and 9′, these slats constituting the table to properly support and carry the slab A of bacon. The conveyor is supported upon and carried by the respective sprocket drums 11 and 12, in turn carried by the respective shafts 15′ and 16′. The links 8 are connected together in the usual manner and have interposed upon the connections thereof the guide rollers 7, as will presently appear. The length of the sprocket chain 10 is a multiple of the pitch circumference of the sprocket wheel 11, in this particular instance, the chain being four times as long as the pitch circumference of the sprockets and the slotted slats 9′ being four to the conveyor or table, so that in one complete movement of the conveyor or table, four slabs of bacon may be operated on, as will presently appear. Each of the slats 9′ is provided with a recess 12 in the rearward edge thereof, which forms a fixed jaw for its respective gripping device 13. This device, as clearly shown in Figures 3 and 4, consists of two bell-crank levers 16 connected together and carried by a shaft 17, which, in turn, is journalled in the brackets 18 connected to and bodily carried by the slat 9′. Carried in the upper member of each bell-crank lever is a rod 14 which is provided with a plurality of pins 15, said pins 15 being adapted to be moved into and out of engagement with the stationary jaw or recess 12 to grip the cut end b of the rind B. Carried by the shaft 19 in the lower ends of each pair of bell-crank levers are the two rollers 20 which are adapted, when the bell-crank levers are in gripping relation, to ride upon the parallel rails 21 disposed in the path of said rollers. The rails are of a sufficient length to permit the gripping action to take place just after the position shown in Figure 3 and during the complete cutting operation or the movement of the slab A to the left, as shown in Figures 3 and 4, and to be released when the roller 20 has assumed the position shown in Figure 6.

To the upper part of the rear legs 2 are pivoted the two swinging arms or radius rods 22, the free ends of which carry the bearing supports 23 between which is disposed the feeding drum 24, said drum being attached fixedly to the shaft 25, which is journaled in said arms. The bearings 26, which support the shaft 25, are adjustably mounted between the two set screws $a$, thus providing a means to properly adjust the shaft 27 to tighten the belt 34, while the radius rods permit the shaft and rollers to be moved up and down relatively to the conveyor. This drum is provided with a plurality of perforations $c$ which act to assist in the gripping thereof upon the upper surface of said slab A.

Figure 2:
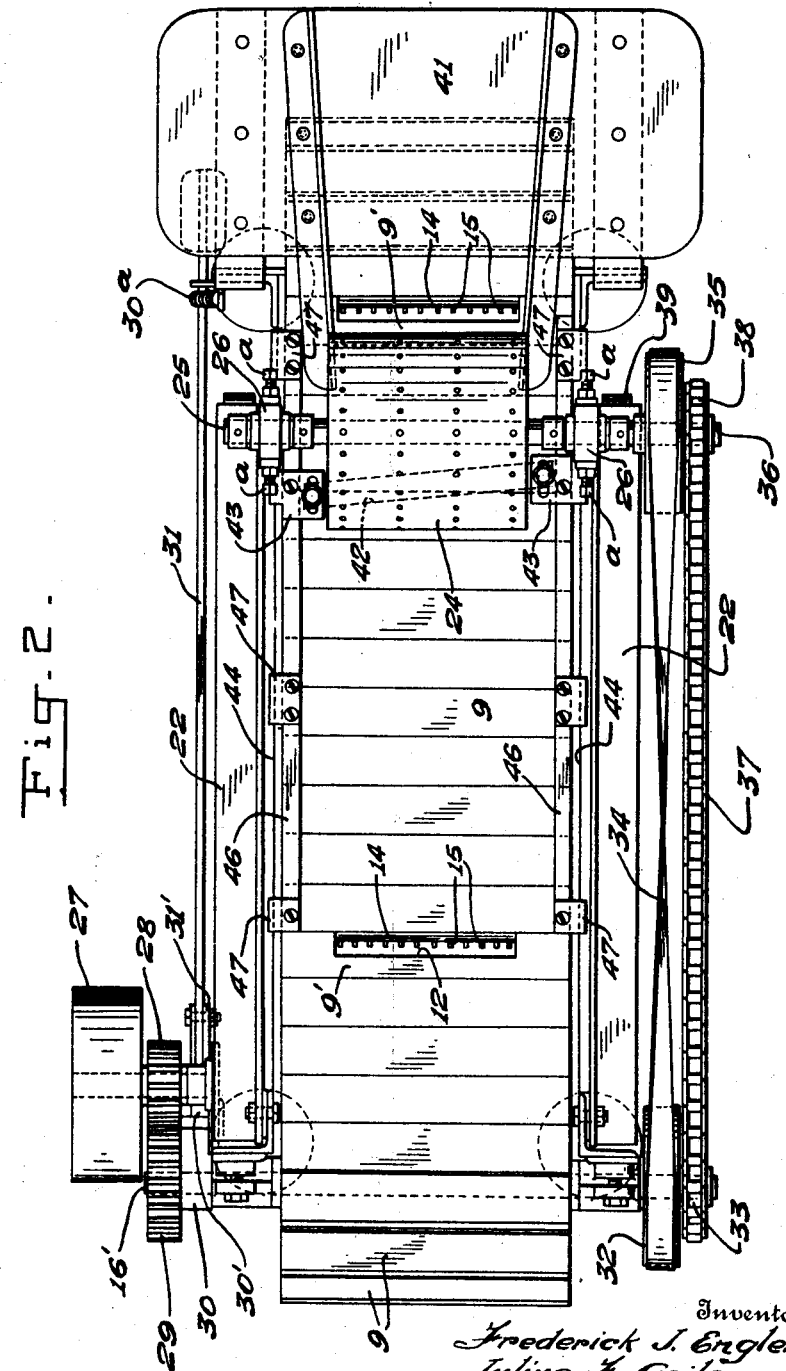
Figure 2 is a top plan view thereof.

The present machine is driven from the driving pulley 27 which, in turn, operates through the pair of gears 28 and 29 the various mechanisms. The gear 29 drives the shaft 16' by means of a positive clutch 30. This clutch is operated through the foot treadle 31 held upwardly by the spring 30$^a$ and through the link 31' and clutch stop bar 30', so that when the pedal is moved downwardly and held for an instant, the machine will be set in operation and will automatically stop, the clutch being thrown out when the parts assume the position as shown in Figures 2 and 3, which is the final cutting operation, the first slab A having passed beyond the knife 42 and the succeeding slat 9' being in position to receive the rind of the next slab. This clutch is of the type known as the Morgan positive clutch and is controlled through the means of the stop bar 30' to permit of this pre-arranged operation.

Upon the extension of the driving shaft 16' is keyed a pulley 32 and the sprocket wheel 33. The pulley 32 drives the drum 24 through the medium of the cross-belt 34 and the pulley 35. The sprocket wheel 33 drives the shaft 36 through the chain 37 and the sprocket wheel 38. To the shaft 36 are keyed two cams 39, one on each side of the machine, and adjacent to the respective supports 23 for said drum, while connected upon the inner side of said supports, one to each, is a cam or roller 40. Thus, as the shaft 36 is rotated, and when the parts are in the position shown in Figure 3, the cam 39 engages its respective cam or roller 40 and thus the two pairs of cams coact to slide upwardly the two supports 23 and the drum 24, elevating the drum to permit ready access to the knife and for the positioning of the new slab A. The action of these cams 39 and 40 is so timed that at the completion of each operation the drum 24 is lifted as before stated, to permit the operator an easy access to present the previously cut end of the rind to the fixed jaw 12 of the gripping device and just at the rear of the feed table 41.

Disposed in the path of the conveyor and just to the rear of the feed roller 24, is the knife or blade 42 attached to the two supports 43, said supports 43, in turn, being connected to the side rails 44 of the machine. The knife 42 is permitted adjustment by means of the respective washers 45 so that a thick or thin cut may be secured, the flat side of the knife being downwardly adjacent to the table so that in the cutting operation the parts will assume the position as shown in Figure 4.

Figure 5:
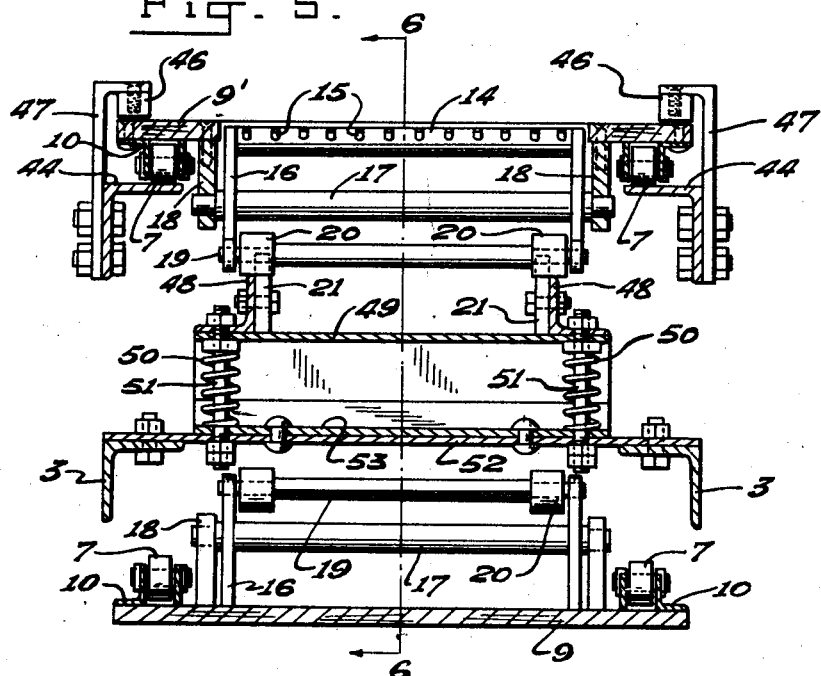
Figure 5 is a cross-section on line 5—5 of Fig. 1, that is through the machine showing the gripping device and adjacent mechanism.
Figure 6:
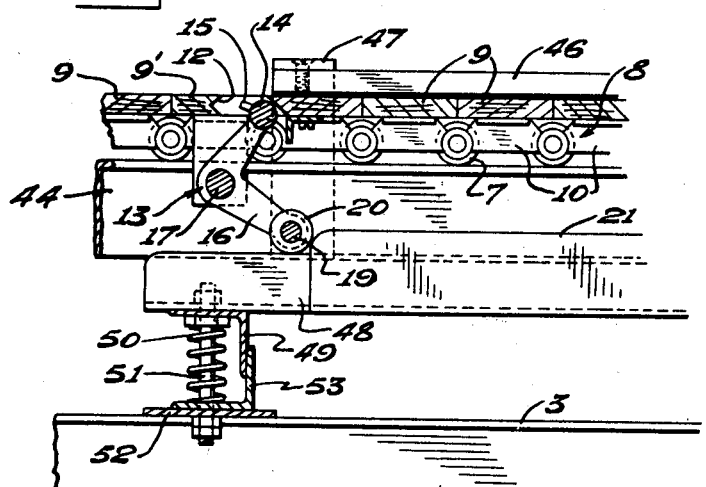
Figure 6 is a section taken on line 6—6 of Figure 5.

The guide bars 46 are carried by the brackets 47 which are, in turn, connected to the side frame members 44, and these bars cooperate with the respective under and upper sides of the conveyor or table, the frames 44 forming the track for the respective rollers 7. The gripping device actuating rails 21 are attached to the angle-irons 48 which, in turn, are connected by transverse angle-irons 49 which, as shown clearly in Figures 5 and 6, cooperate with the cross angle-irons 53 supported upon the plates 52 and the frame members 3. The bolts 51 connect the two angle-irons 48 and 53 for sliding movement while the springs 50 provide a resilient cushion between such members and have a tendency to hold the rails 21 upwardly. Thus, when the rollers 20 engage the rails, the springs take care of the shock and resiliently hold the gripping members with the pins 15 engaging the terminal $b$ of the rind and holding it firmly against the fixed jaw 12 of its respective slat 9' during the movement of the same in the position, as shown in Figure 3, to the position that the slat 9' will assume in Figure 2, or when the roller 20 has passed beyond the end of the rails 21, as illustrated in Figure 6, and has automatically released the pins 15 from the fixed jaw 12 and the terminal $b$ of the rind.

From the foregoing description, the operation of the present device is readily understood, but, briefly stated, it is as follows: Assuming the parts to be in the position as shown in Figures 2 and 3, the slab A of bacon having had the terminal $b$ of the rind previously severed or cut, as clearly shown in Figure 3, the said terminal is placed adjacent the fixed jaw 12 of the slat 9' with the slab A resting upon the feed table 41. The operator now depresses the foot treadle 31, holding the same for a moment and until the clutch 30 has been thrown in and the conveyor table moved in the direction of the arrow. As soon as the rollers 20 engage the forward ends of the rails 21, the rod 14 is thrown forwardly to cause the pins 15 thereof to engage the terminal $b$ of the rind and press it firmly into the fixed jaw 12, and as the conveyor moves forward with the rollers resting upon the rails 21, the rind is firmly gripped, as shown in Figure 4, and not released until the parts assume the position as shown in Figure 6, at which time, through the automatic actuation of the clutch stop bar 30', the clutch is released and the mechanism comes to a halt. This slab including the rind, is then removed from the machine and the parts are again in the position to receive the next slab and repeat the foregoing operation.

It is evident from the foregoing that with a machine of this character, the knife being adjustable, the skin or rind may be removed in a practical and speedy manner with the least possible waste, and that by arranging the gripping devices and the travelling table as shown, the slab to be operated upon is readily and easily put in position while the two pieces comprising the slab and severed rind are readily removed at the side of the machine.

By making the conveyor table an endless one and arranging it so that a series of operations may be intermittently carried on, it is evident that two operators, one feeding in and the other removing, can speed up their work and remove the skin from the slab of bacon in a thorough and efficient manner.

We claim:—

1. In a meat skinning machine, the combination with a conveyor, a stationary cutter in the path thereof, a roller for pressing the meat downwardly to assist the conveyor in feeding the meat during the cutting operation and automatic means for elevating the roller in timed relation to the conveyor to permit the insertion of a new slab of meat, of a skin gripping device carried by the conveyor for gripping the separated skin and for holding it during the cutting operation.

2. In a meat skinning machine, the combination with a conveyor, a stationary cutter in the path thereof, a roller for pressing the meat downwardly to assist the conveyor in feeding the meat during the cutting operation and automatic means for elevating the roller in timed relation to the conveyor to permit the insertion of a new slab of meat, of a skin gripping device carried by the conveyor for gripping the separated skin and for holding it during the cutting operation, and means disposed in the path of the gripping device for moving it into and out of gripping relation during the movement of the conveyor.

3. In a meat skinning machine, the combination with a conveyor, a stationary cutter in the path thereof, a roller for pressing the meat downwardly to assist the conveyor in feeding the meat during the cutting operation and automatic means for elevating the roller in timed relation to the conveyor to permit the insertion of a new slab of meat, of a skin gripping device carried by the conveyor for gripping the separated skin and for holding it during the cutting operation, and cooperative means carried by the gripping device and in the path thereof for moving the gripping device into and out of operation.

4. In a meat skinning machine, the combination with a conveyor, a cutter, a slidably mounted roller for holding the meat downwardly upon the conveyor during the cutting operation and automatic means for elevating the roller in timed relation to the conveyor to permit the insertion of a new slab of meat, of means for gripping the forward edge of the skin carried by the conveyor, and means for moving the latter means into gripping relation just previous to the meat engaging the cutter and for releasing the same after the meat has passed the cutter.

5. In a meat skinning machine, the combination with an endless conveyor having a plurality of slats, certain of said slats constituting a fixed jaw, a movable jaw carried by the conveyor adjacent to said fixed jaw, and forming therewith a gripping device, and means disposed in the path of the movable jaw for moving the same into and out of engagement with the fixed jaw during the movement of the conveyor.

6. In a meat skinning machine, the combination of an endless conveyor composed of a plurality of transverse slats, certain of said slats constituting a fixed jaw, two bell-crank levers operably connected together and bodily carried by the endless conveyor, a movable jaw carried by said bell-crank levers and in a path to engage the fixed jaw and to form therewith a gripping device, and means disposed in the path of the bell-crank levers for operating the same to cause the movable jaw to be moved into and out of engagement with the fixed jaw.

7. In a meat skinning machine, the combination of an endless conveyor composed of a plurality of transverse slats, certain of said slats constituting a fixed jaw, two bell-crank levers operably connected together and bodily carried by the endless conveyor, a movable jaw carried by said bell-crank levers and in a path to engage the fixed jaw and to form therewith a gripping device, and resilient means disposed in the path of the bell-crank levers for operating the same to cause the movable jaw to be moved into and out of engagement with the fixed jaw.

8. In a meat skinning machine, the combination of an endless conveyor composed of a plurality of transverse slats, certain of said slats constituting a fixed jaw, two bell-crank levers operably connected together and bodily carried by the endless conveyor, a movable jaw carried by said bell-crank levers and in a path to engage the fixed jaw and to form therewith a gripping device, and two rails disposed below and in the path of to engage said bell-crank levers whereby the bell-crank levers are rocked to cause the movable jaw to move into and out of engagement with the fixed jaw.

9. In a meat skinning machine, the combination of an endless conveyor composed of a plurality of transverse slats, certain of said slats constituting a fixed jaw, two bell-crank levers operably connected together and bodily carried by the endless conveyor, a movable jaw carried by said bell-crank levers and in a path to engage the fixed jaw and to form therewith a gripping device, and two rails mounted resiliently below and in the path of to engage said bell-crank levers whereby the bell-crank levers are rocked to cause the movable jaw to move into and out of engagement with the fixed jaw.

10. In a meat skinning machine, the combination of a frame, an endless conveyor mounted therein and provided with a plurality of fixed jaws, a plurality of movable jaws carried by the conveyor one to each fixed jaw, and means disposed in the path of the movable jaws whereby each of said movable jaws is moved into engagement with the fixed jaw to clamp the end of the rind between the jaws, held in said engagement for a predetermined period and released therefrom.

11. In a meat skinning machine, the combination of a frame, an endless conveyor mounted therein and provided with a plurality of fixed jaws, a plurality of movable jaws carried by the conveyor one to each fixed jaw, and resilient means disposed in the path of the movable jaws to compensate for the thickness of rind gripped between the jaws and whereby each of said movable jaws is moved into engagement with the fixed jaw to clamp the end of the rind between the jaws, held in said engagement for a predetermined period and released therefrom.

12. In a meat skinning machine, the combination of a frame, an endless conveyor mounted therein and provided with a plurality of fixed jaws, a plurality of movable jaws carried by the conveyor one to each fixed jaw, and means disposed in the path of the movable jaws whereby each of said movable jaws is moved into engagement with the fixed jaw to clamp the end of the rind between the jaws, held in said engagement for a predetermined period and released therefrom, said last-mentioned means comprising two parallel rails disposed below the conveyor and resiliently supported to be held cushionedly toward the conveyor.

13. In a meat skinning machine, the combination of a frame, an endless conveyor mounted therein, a plurality of fixed jaws carried by said conveyor in spaced relation to each other, a plurality of movable jaws one to each fixed jaw, a rock shaft carrying each movable jaw and journaled to and carried by its fixed jaw, and cooperative means carried by the rock shaft and in the path thereof for causing the movable jaw to be moved into engagement with the fixed jaw to clamp the end of the rind between the jaws, to hold it in such engagement and to be released after having travelled a predetermined distance.

14. In a meat skinning machine, the combination of a frame, an endless conveyor mounted therein, a plurality of fixed jaws carried by said conveyor in spaced relation to each other, a plurality of movable jaws one to each fixed jaw, a rock shaft carrying each movable jaw and journaled to and carried by its fixed jaw, and cooperative means carried by the rock shaft and in the path thereof for causing the movable jaw to be moved into engagement with the fixed jaw to clamp the end of the rind between the jaws, to hold it in such engagement and to be released after having travelled a predetermined distance, said latter means including a resiliently supported base and two rails carried by the base and disposed in the path of to engage the rock shafts to operate the movable jaw.

15. In a meat skinning machine, the combination of a frame, an endless conveyor mounted therein, a plurality of fixed jaws carried by the endless conveyor in spaced relation to each other, a plurality of rock shafts one carried by each fixed jaw, a movable jaw connected to each rock shaft and in cooperative relation with each fixed jaw, and cooperative operating means for the movable jaw carried by each rock shaft and disposed in the path thereof for actuating the movable jaw, the latter including two resiliently supported rails mounted in the frame and in the path to engage the operating portion of the rock shaft.

16. In a meat skinning machine, the combination of a frame, an endless conveyor mounted therein, cooperative skin-gripping means carried by the endless conveyor, a pair of swinging arms connected to the frame, an auxiliary feeding roller carried by and movable with said arm, and means for moving the latter to and from the frame operated in consonance with the endless conveyor.

17. In a meat skinning machine, the combination with a frame, an endless conveyor mounted therein, a cam shaft mounted therein, means for driving the cam shaft and endless conveyor simultaneously, a vertically movable feed-in roller mounted adjacent the cam shaft and above the conveyor, and cooperative cams carried by the cam shaft and operably connected to the feed-in roller whereby at a predetermined movement of the conveyor the feed-in roller is elevated or lowered.

18. In a meat skinning machine, the combination with a frame, drive mechanism carried thereby, an endless conveyor operably connected to the drive mechanism, a cam shaft also operably connected with the drive mechanism, a vertically slidable frame carried adjacent the feed-in end of the frame, a feed-in roller carried by the latter, cooperative cams carried by the cam shaft and the vertically slidable frame for imparting vertical movement to the latter, a plurality of gripping devices carried by the conveyor, and means disposed within the path thereof to actuate the gripping devices to grip the skin of the meat to hold it in such position during a predetermined distance of movement of the conveyor and for releasing the same simultaneously with the elevation of the feed-in roller.

In testimony whereof we have hereunto set our hands.

FREDERICK J. ENGLEN.
JULIUS F. GEILER.